(12) United States Patent
Thurn et al.

(10) Patent No.: US 8,395,863 B2
(45) Date of Patent: Mar. 12, 2013

(54) LAMINATED CONTACT PAD FOR A TRANSDUCER HEAD

(75) Inventors: Jeremy A. Thurn, Bloomington, MN (US); Ibro Tabakovic, Edina, MN (US); Maissarath Nassirou, Fremont, CA (US); Brian Karr, Savage, MN (US); Kurt W. Wierman, Eden Prairie, MN (US); Joachim W. Ahner, Livermore, CA (US)

(73) Assignee: Seagate Technology LLC, Cupertino, CA (US)

( * ) Notice: Subject to any disclaimer, the term of this patent is extended or adjusted under 35 U.S.C. 154(b) by 127 days.

(21) Appl. No.: 12/846,183

(22) Filed: Jul. 29, 2010

(65) Prior Publication Data

US 2012/0026625 A1 Feb. 2, 2012

(51) Int. Cl.
*G11B 5/187* (2006.01)
*G11B 5/60* (2006.01)

(52) U.S. Cl. ............ 360/125.16; 360/125.26; 360/235.2; 360/235.7; 360/235.8; 360/236.5; 360/236.6

(58) Field of Classification Search ............. 360/125.12, 360/125.26, 125.3, 237.1, 235.2, 235.8, 236.3, 360/236.6, 237, 125.16, 235.3, 235.7, 236.5
See application file for complete search history.

(56) References Cited

U.S. PATENT DOCUMENTS

| 5,725,687 | A | | 3/1998 | Murakami et al. |
| 5,841,608 | A | * | 11/1998 | Kasamatsu et al. ........ 360/236.6 |
| 6,252,742 | B1 | * | 6/2001 | Kameyama ................... 360/237 |
| 6,433,965 | B1 | * | 8/2002 | Gopinathan et al. ........ 360/235.4 |
| 6,791,796 | B2 | * | 9/2004 | Shukh et al. ............. 360/125.12 |
| 6,869,675 | B2 | | 3/2005 | Nair et al. |
| 6,956,718 | B1 | | 10/2005 | Kulkarni et al. |
| 2001/0019467 | A1 | * | 9/2001 | Otsuka et al. ............. 360/235.2 |
| 2006/0000079 | A1 | * | 1/2006 | Ding et al. ................. 29/603.12 |
| 2007/0041127 | A1 | * | 2/2007 | Kameda et al. ............... 360/126 |

OTHER PUBLICATIONS http://en.wikipedia.org/wiki/Grain_boundary_strengthening; Jul. 29, 2010; pp. 1-6.
Haibo Huang et al., Tensile Testing of Free-Standing Cu, Ag and Al Thin Films and Ag/Cu Multilayers; Acta mater. 48 (2000) 3261-3269, Received Oct. 8, 1999; Accepted Feb. 27, 2000.

* cited by examiner

*Primary Examiner* — Jefferson Evans
(74) *Attorney, Agent, or Firm* — HolzerIPLaw, PC (57) ABSTRACT

A contact pad includes a first layer of material with a first yield strength and a second layer of material with a second yield strength is laminated to the first layer. A third yield strength of the laminated composite of the first layer and the second layer exceeds the first yield strength and the second yield strength due to the Hall-Petch phenomenon. An overcoat covers an edge of the first layer and the second layer of the contact pad to prevent wear. A method of creating the contact pad or other microelectronic structure includes depositing a first layer of material with a first yield strength on a substrate. A second layer of material with a second yield strength is deposited on the first layer. An edge of the first layer and the second layer is coated with an overcoat material to prevent wear of the first and second layers.

22 Claims, 7 Drawing Sheets

LAMINATED CONTACT PAD FOR A TRANSDUCER HEAD

BACKGROUND

In magnetic storage systems, a thin film transducer head includes a plurality of microelectronic components (e.g., a reader, a writer, one or more reader shields, and one or more return poles) deposited on a surface of a slider. The transducer head is mounted to a distal end of an actuator arm and is positioned over a surface of a spinning magnetic disc. A lift force is generated by an aerodynamic interaction between the slider and the spinning disc. The lift force is opposed by equal and opposite spring forces applied through the actuator arm such that a predetermined flying height is maintained over the surface of the spinning magnetic disc. The flying height is defined as the spacing between the surface of the spinning magnetic disc and the lowest point on the slider assembly (i.e., the contact pad).

One objective of the design of a transducer head is to obtain a very small flying height between the microelectronic components and the disc surface. By designing magnetic storage systems with a flying height close to the disc, shorter wavelength or higher frequency signals may be used to record data to the disc. Shorter wavelength or higher frequency recording signals allow for higher density and higher storage data recording capacity of the magnetic disc.

Ideally, the contact pad does not come in contact with the magnetic disc and thus there is no wear on the contact pad. Practically, however, during various phases of disc operation the contact pad contacts the highest asperities on the spinning magnetic disc. As flying height is decreased to improve disc performance, the frequency of the contact pad contacting the disc typically increases.

SUMMARY

In one embodiment, the presently disclosed technology includes a transducer head with a reader and a contact pad. The contact pad extends beyond the reader and includes a first layer of material, a second layer of material, and an overcoat. The first layer of material has a first yield strength. The second layer of material has a second yield strength and is laminated to the first layer of material. A third yield strength of a laminated composite of the first layer and the second layer exceeds the first yield strength and the second yield strength. The overcoat is in contact with an edge of the first layer and the second layer.

DETAILED DESCRIPTIONS

During various phases of disc operation, a contact pad on a transducer head slider contacts the highest asperities on a spinning magnetic disc. For example, the contact pad may be in contact with the disc during hard disc assembly and testing or periodic adjustment operations that set the fly height of the transducer head slider. Further, any manufacturing defects, or contaminates that are in the path of the slider may impact the contact pad during disc operation. Still further, the natural roughness of the disc may cause the contact pad to periodically contact the magnetic disc. Also, abrupt motion of the hard disc (e.g., when a laptop computer with a hard disc drive is dropped and impacts a hard surface) may cause the contact pad to contact the disc.

To address the potential contact between the transducer head and the disc, one or more microelectronic components of the transducer head may be coated with a thin overcoat material to protect the contact pad and/or transducer head components from wear and exposure to potential contaminates. However, the overcoat material increases the distance between the magnetic media within the disc and the transducer head by adding an additional layer between the transducer head and the disc. Increased distance between the magnetic media and the transducer head decreases performance of the disc similar to increased fly height. Therefore, traditionally the transducer head overcoat has been made as thin as possible. However, thinner transducer head overcoats are typically less wear resistant. As a result, there is often a tradeoff between wear resistance of the transducer head overcoat layer and increased distance between the magnetic media and the transducer head.

Typically, the transducer head overcoat wear resistance is improved by either utilizing a harder material for the overcoat, increasing the thickness of the overcoat, and/or reducing the likelihood of contact between the contact pad and a corresponding spinning magnetic disc. In the presently disclosed technology, the contact pad includes a plurality of laminated layers in an effort to increase the wear resistance of the overcoat.

Figure 1:
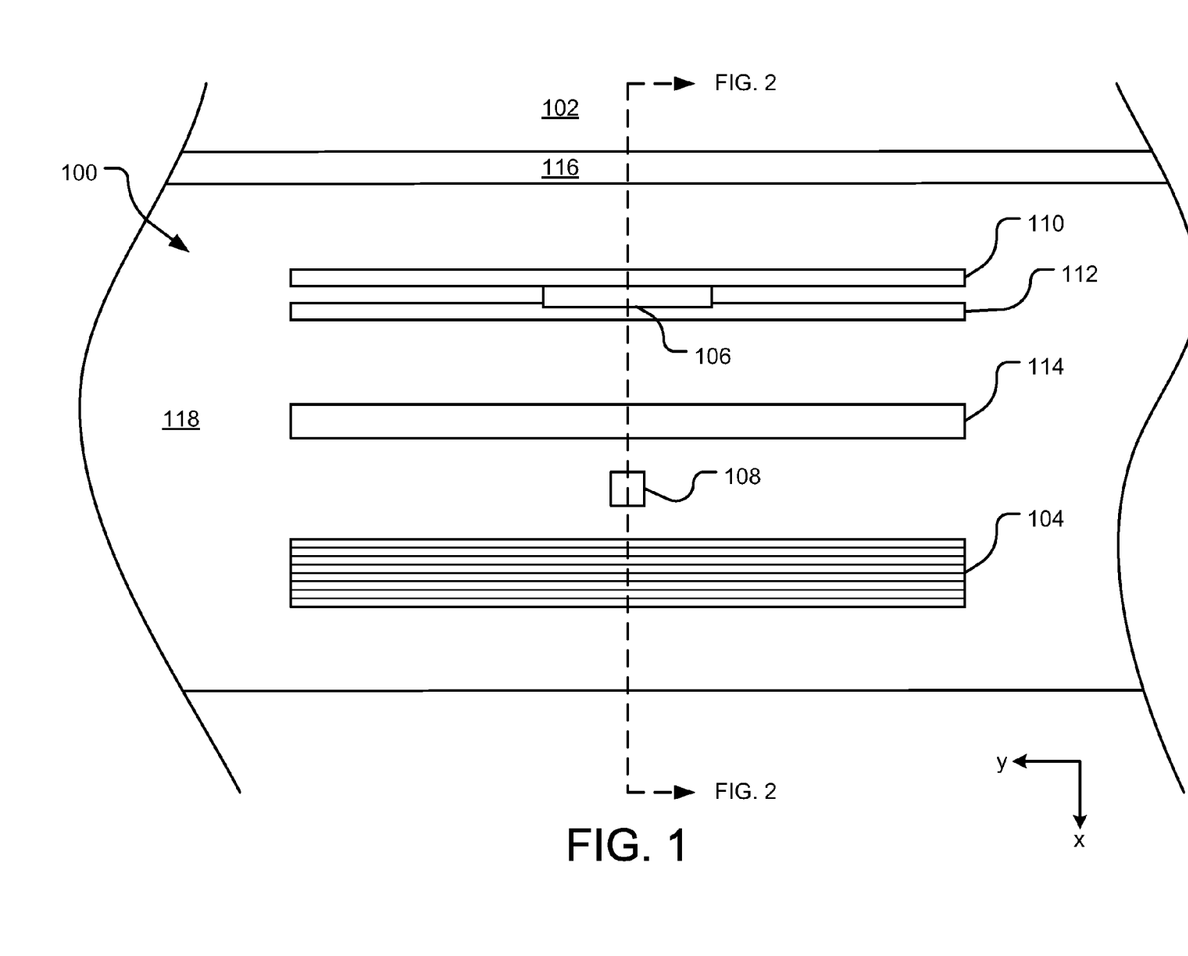
FIG. 1 illustrates a plan view of an example array of microelectronics deposited on a trailing surface of a slider with a laminated first return pole.

FIG. 1 illustrates a plan view of an example array of microelectronics 100 deposited on a trailing surface of a slider 102 with a laminated first return pole 104. The microelectronics 100 include various components for reading and writing information to and from a magnetic media (i.e. a reader 106, a writer 108, a first reader shield 110, a second reader shield 112, the first return pole 104, and a second return pole 114) which are mounted on a substrate 116 and separated by dielectric material 118. The microelectronic components are also separated from an external environment by the dielectric material 118. In other embodiments additional microelectronic components may be deposited on the slider 102. The array of microelectronics 100 are not shown to scale in FIG. 1. In many embodiments, the thickness in the x-direction is very small with respect to the width in the y-direction of the substrate 116, the microelectronic components, and the dielectric material 118.

The microelectronics 100 may be installed onto the slider 102 using a variety of microelectronic fabrication techniques. For example, a substrate material 116 (e.g., a silicon wafer) may be attached to the slider 102 that is well adapted to accept the various microelectronic components. Often the microelectronics 100 are deposited onto the substrate 116 using one or more thin films. The thin films may be patterned to give the layers distinctive features or form openings in the layers. The thin films may also include the dielectric material 118 to separate the microelectronic components. Further, the thin films may also be etched to remove some undesirable portions of the thin films or the substrate 116. Still further, the thin films and/or substrate may be further modified using processes including, but not limited to doping (using thermal diffusion and/or ion implantation), micro-cutting/micro-fabrication, chemical-mechanical planarization, wafer cleaning or other surface preparation, and wire bonding.

In an embodiment where the microelectronic components 110 are manufactured using deposition, a dielectric material 118 is first deposited on the substrate 116. The dielectric material 118 is typically a non-conductive material that serves to bond the microelectronics 100 to the substrate 116 and/or anchor the microelectronics 100 within the dielectric material 118. The dielectric material 118 may also fill gaps between various microelectronic components and also may encompass the microelectronics 100 to protect the microelectronics 100 from damage from an external environment (e.g., physical impact, contaminants, and oxidation). Moving in the x-direction, the first reader shield 110 is deposited on the dielectric material 118. The reader 106 is deposited on the first reader shield 110 and the second reader shield 112 is deposited on the reader 106. The reader shields 110, 112 serve to electrically and/or magnetically isolate the reader 106 from other components of the microelectronics 100 (e.g., the writer 108).

Still moving in the x-direction, the second return pole 114 is deposited with a layer of dielectric material 118 separating the second reader shield 112 from the second return pole 114. The writer 108 and the first return pole 104 are then deposited with layers of dielectric material 118 in between each of the writer 108 and return poles 104, 114. Magnetic flux flows from the writer 108 to a magnetic media in close proximity to the writer 108 and back through one or both of the return poles 104, 114 in order to write bits of data to the magnetic media. The dielectric material 118 covers the first return pole 104 and seals the microelectronics 100 from the external environment. The dielectric material 118 may comprise one material for all areas of the microelectronics 100 or it may comprise different materials for layers of dielectric material 118 adjacent the substrate, between the microelectronic components, and/or sealing the microelectronics 100 from the external environment.

The microelectronic components (e.g., the reader 106, writer 108, reader shields 110, 112, and/or return poles 104, 114) detect and/or pass the magnetic flux to and from the magnetic media. As a result, the microelectronic components often comprise a metal with known magnetic properties. However, transducer head overcoats are more durable when deposited over harder materials (e.g., ceramics). More specifically, wear resistance of a thin coating on a substrate is impacted by the mechanical properties of both the substrate and the coating because elastic stress fields of contact with a foreign body (e.g., a magnetic media) extend through the coating and into the substrate. Thus, a contact response is a composite response of both the substrate and the coating. To investigate this phenomenon, two tests are performed; a pin-on-disk reciprocating ball test and a nanoindentation wear box test.

The pin-on-disk reciprocating ball test involves sliding a steel ball-bearing coated with amorphous carbon across two coupons; the first coupon having a silicon substrate coated with a deposited metal (e.g., NiFe) and a diamond-like carbon film and the second coupon having a $Al_2O_3$—TiC substrate coated with a ceramic material (e.g., alumina) and a diamond-like carbon film. In one example embodiment of the pin-on-disk reciprocating ball test, the steel ball is 9.5 millimeters in diameter, the contact force between the steel ball and the coupons is measured at several increments between 20 millinewtons and 500 millinewtons, and the steel ball is moves across the coupons at 8 millimeters per second for 3 minutes per contact force increment. Further, in this example embodiment, the deposited metal material is a 400 Angstroms thick sputtered permalloy and the ceramic material is a 3 micrometer thick sputtered alumina. Still further, in this example embodiment, the permalloy and the alumina have similar Young's moduli, however, the alumina has an approximately 50% higher hardness than the permalloy. Additionally, in this example embodiment, the alumina is relatively brittle with a high yield stress and thus more susceptible to fracture when subjected to indenture testing than the permalloy, which is relatively ductile with a lower yield stress than the alumina.

After completing the aforementioned pin-on-disk reciprocating ball test to the permalloy and alumina coated coupons described above, inspection of the resulting wear tracks on the coupons reveals a transition from light wear to severe wear of the diamond-like carbon film on the coupons at a particular force magnitude. This transition is referred to herein as the "critical wear force." The critical wear force on the alumina coated coupon is at least double that on the permalloy coated coupon. Further, increasing the coating thickness (in both the permalloy and the alumina coatings) also increases the critical wear force.

The nanoindentation wear box test involves using a nanoindenter with a 3-sided pyramidal diamond "Berkovich" indenter tip. The indenter tip moves across both a contact pad region (composed of a Nickel-iron alloy) and a dielectric region (composed of alumina) on a transducer of a finished slider with an overcoat. The indenter tip moves across the transducer at several load increments varying between 5 micronewtons and 60 micronewtons in a serpentine pattern to create a 2 micrometer square worn region on the transducer hereinafter referred to as a "wear box." The amount of overcoat material (e.g., diamond-like-carbon material) worn away during each load increment may be determined using Auger Electron Spectroscopy calibrated to relate carbon peak height on the transducer to overcoat thickness inside the wear box.

In one example embodiment of the nanoindentation wear box test, the overcoat on the Nickel-iron alloy contact pad region begins to wear away at a 20 micronewton load and 15 Angstroms of overcoat material is worn away after a 40 micronewton load increment. The overcoat on the alumina dielectric region is able to withstand a much higher load (i.e., the critical wear force) than the overcoat on the contact pad before wear began. Further, after the critical wear force is exceeded, significantly less overcoat material is worn away from the dielectric region as compared to the contact pad region.

Both the pin-on-disk reciprocating ball and the nanoindentation wear box tests show that the overcoat material has significantly greater wear resistance when tested on an alumina substrate than on a permalloy substrate. As the alumina and permalloy have similar Young's moduli, the improvement in wear performance is attributed to the higher hardness (i.e., yield strength of the alumina over the permalloy. As a result, using a harder material for the reader 106, writer 108, reader shields 110, 112, and/or return poles 104, 114 can improve the wear-resistance of an overcoat material covering the reader 106, writer 108, reader shields 110, 112, and/or return poles 104, 114.

Unfortunately, harder materials are not always available that meet the requisite magnetic properties for the reader 106, writer 108, reader shields 110, 112, and/or return poles 104, 114. One alternative to using harder materials is laminating thin film layers of softer materials with the desired magnetic properties together. The resulting yield strength is improved due to the Hall-Petch phenomenon, which operates on the theory that grain boundaries impede dislocation movement and that the number of dislocations within a grain have an effect on how easily dislocations can traverse grain boundaries and travel from grain to grain. By making each layer very thin, grain size is reduced in the composite material. This results in a more brittle material with an improved yield strength as compared with the materials making up each of the layers alone.

As a result, one or more of the microelectronic components may comprise a stack of alternating laminated soft metals to increase the yield strength of the microelectronic component(s) without significantly affecting the magnetic properties of the microelectronic component(s). In the embodiment shown in FIG. 1, the first return pole 104 comprises eight thin film layers of soft metals laminated together. In various other embodiments, the first return pole 104 may comprise more or less laminated layers and one or more of the other microelectronic components may be laminated as well.

In one example embodiment, the contact pad comprises alternating thin film layers of silver (or a silver alloy) and copper (or a copper alloy), each layer with a thickness of less than 200 nanometers but more than 50 nanometers. Thicknesses less than 50 nanometers but more than 10 nanometers may also be used; however, processing such thin films may be difficult. As pure metals, both silver and copper have a relatively low yield strength typical of soft elemental metals. However, as the thickness of the silver and copper layers is decreased, a composite of the silver and copper transitions to high yield strength behavior and ultimately to brittle behavior.

In other embodiments, a non-ferromagnetic material may be laminated with a ferromagnetic material to obtain the desired yield strength while maintaining desired magnetic properties with the composite material. Some example potential ferromagnetic—ferromagnetic and ferromagnetic—non-ferromagnetic combinations include nickel ferrite (NiFe)/cobalt nickel ferrite (CoNiFe), cobalt ferrite (CoFe)/CoNiFe, NiFe/nickel phosphorus (NiP), CoFe/cobalt phosphorus (CoP), and CoFe/NiFe. In various embodiments, there may be two or more layers including two or more different materials. Other thicknesses and materials are also contemplated herein.

Figure 2:
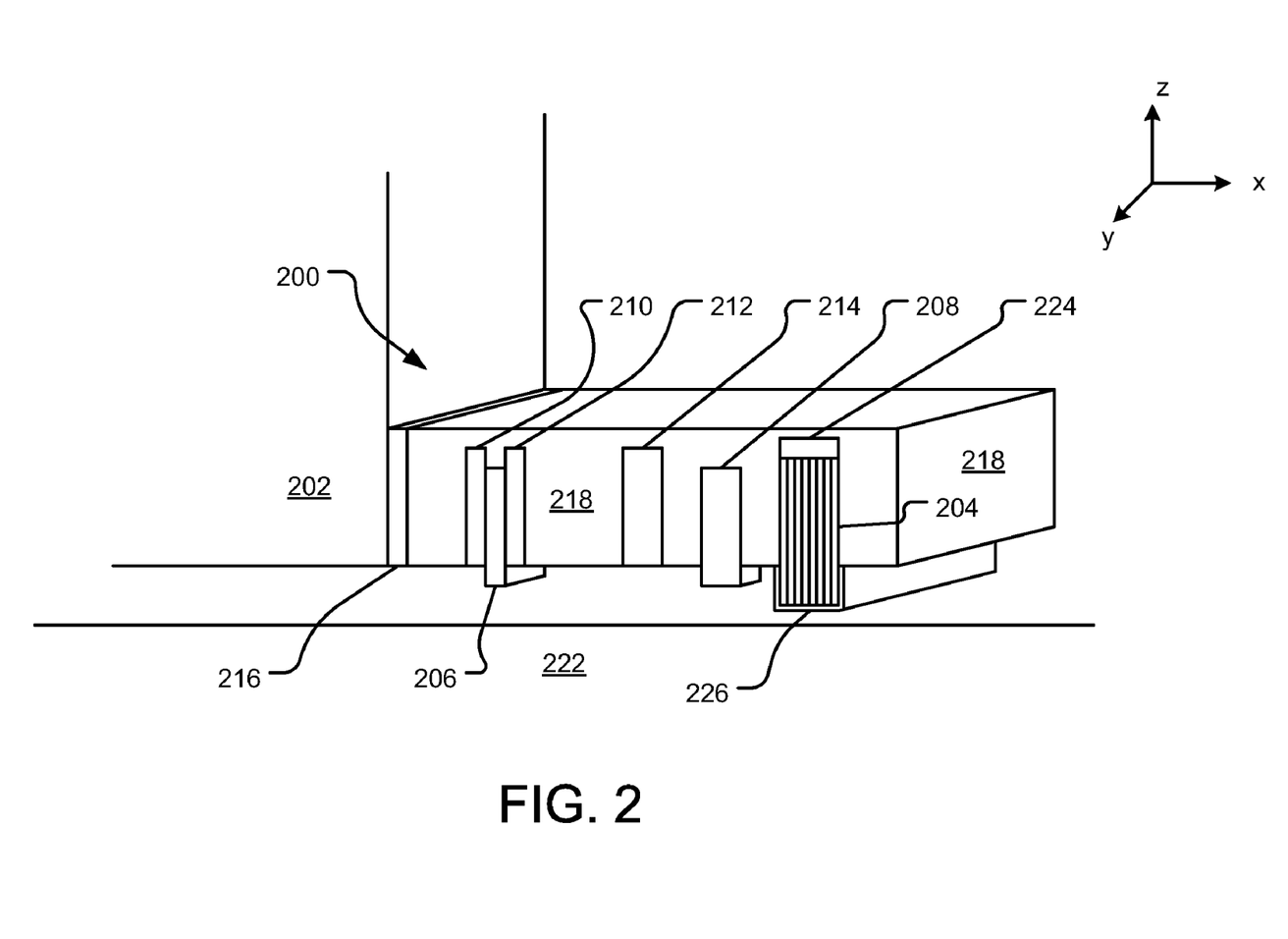
FIG. 2 illustrates a sectional isometric view of the example array of microelectronics of FIG. 1 at Section 2-2.

FIG. 2 illustrates a sectional isometric view of the example array of the microelectronics 100 of FIG. 1 at Section 2-2. FIG. 2 is drawn for illustrative purposes only and does not indicate scale of any of the microelectronics 200 with respect to the slider 202. For example, in many embodiments the thickness of the microelectronics 200 and dielectric material 218 in the x-direction is shown exaggerated with respect to the width in the y-direction and height in the z-direction of the microelectronics 200 and dielectric material 218. Typically, one or more of the microelectronic components (e.g., a reader 206, a writer 208, a first reader shield 210, a second reader shield 212, a first return pole 204, and a second return pole 214) is adapted to contact a magnetic media 222 before the other microelectronic components. More specifically, the microelectronic component(s) adapted to contact the magnetic media 222 before the other microelectronic components may protrude closer to the magnetic media 222. The microelectronic component(s) that extend closest to the magnetic media 222 are referred to herein as the contact pad. In FIG. 2, the first return pole 204 is the contact pad because it extends closer to the magnetic media 222 than the other microelectronic components.

As described in detail with respect to FIG. 1, moving in the x-direction, FIG. 2 depicts a dielectric material 218 deposited on a substrate 216. The first reader shield 210 is deposited on the dielectric material 218. The reader 206 is deposited on the first reader shield 210 and the second reader shield 212 is deposited on the reader 206. A layer of dielectric material 218 separates the second reader shield 212 from the second return pole 214. The writer 208 and the first return pole 204 are deposited with layers of dielectric material 218 in between each of the writer 208 and return poles 204, 214. The first return pole 204 (here the contact pad) comprises eight thin film layers of soft metals laminated together in this embodiment. In various other embodiments, the first return pole 204 may comprise more or less laminated layers and other microelectronic components may also be used as contact pads in addition to the first return pole 204. The dielectric material 218 covers the first return pole 204 and seals the microelectronics 200 (except portions of the microelectronics 200 facing the magnetic media 222 are left exposed).

The microelectronics 200 may also be equipped with a heater 224 attached to the first return pole 204. The heater 224 is adapted to expand when charged, thereby pushing the first return pole 204 closer to the magnetic media (negative z-direction). Pushing the first return pole 204 closer to the magnetic media may make the first return pole 204 the closest microelectronic component to the magnetic media and thus make the first return pole 204 an effective contact pad. Similarly, the heater 224 can contract to move the first return pole 204 away from the magnetic media (positive z-direction). In other embodiments, there is no heater and the first return pole 204 extends a fixed distance in the negative z-direction toward the magnetic media 222. In still other embodiments, the heater 224 is attached to one or more of the other microelectronic components (e.g., the reader 206, the writer 208, the first reader shield 210, the second reader shield 212, and the second return pole 214) and moves the other microelectronic component(s) in the positive z-direction and/or negative z-direction. In this embodiment, one or more of the other microelectronic components attached to the heater 224 acts as the contact pad.

A portion of the first return pole 204 projecting out of the dielectric material 218 toward the magnetic media 222 is covered with an overcoat 226. In one embodiment, the overcoat 226 contacts an edge of each of the eight thin film layers of the first return pole 204. The overcoat 226 protects the first return pole from damage caused by impact with the magnetic media, or contaminants on the magnetic media. The overcoat 226 often comprises a diamond-like-carbon (DLC) material; however, other materials may be used to cover the exposed portion of the first return pole 204. The overcoat 226 may also cover exposed portions of other microelectronic components that may come in contact with the magnetic media 222 or contaminants on the magnetic media 222. For example, if the second return pole 214 is a contact pad in addition to or instead of the first return pole 204, the second return pole 214 may also be covered with the overcoat 226. Still further, the entire surface of the microelectronics 200 facing the magnetic media 222 may be covered with the overcoat 226 because it may be difficult to concentrate the overcoat 226 only on a specific area of the microelectronics 200. By utilizing a laminated composite first return pole 214 rather than a singular soft metal first return pole 214, the wear resistance of the overcoat 226 in the area of the first return pole 204 is improved as discussed in more detail with regard to FIG. 1.

Figure 3:
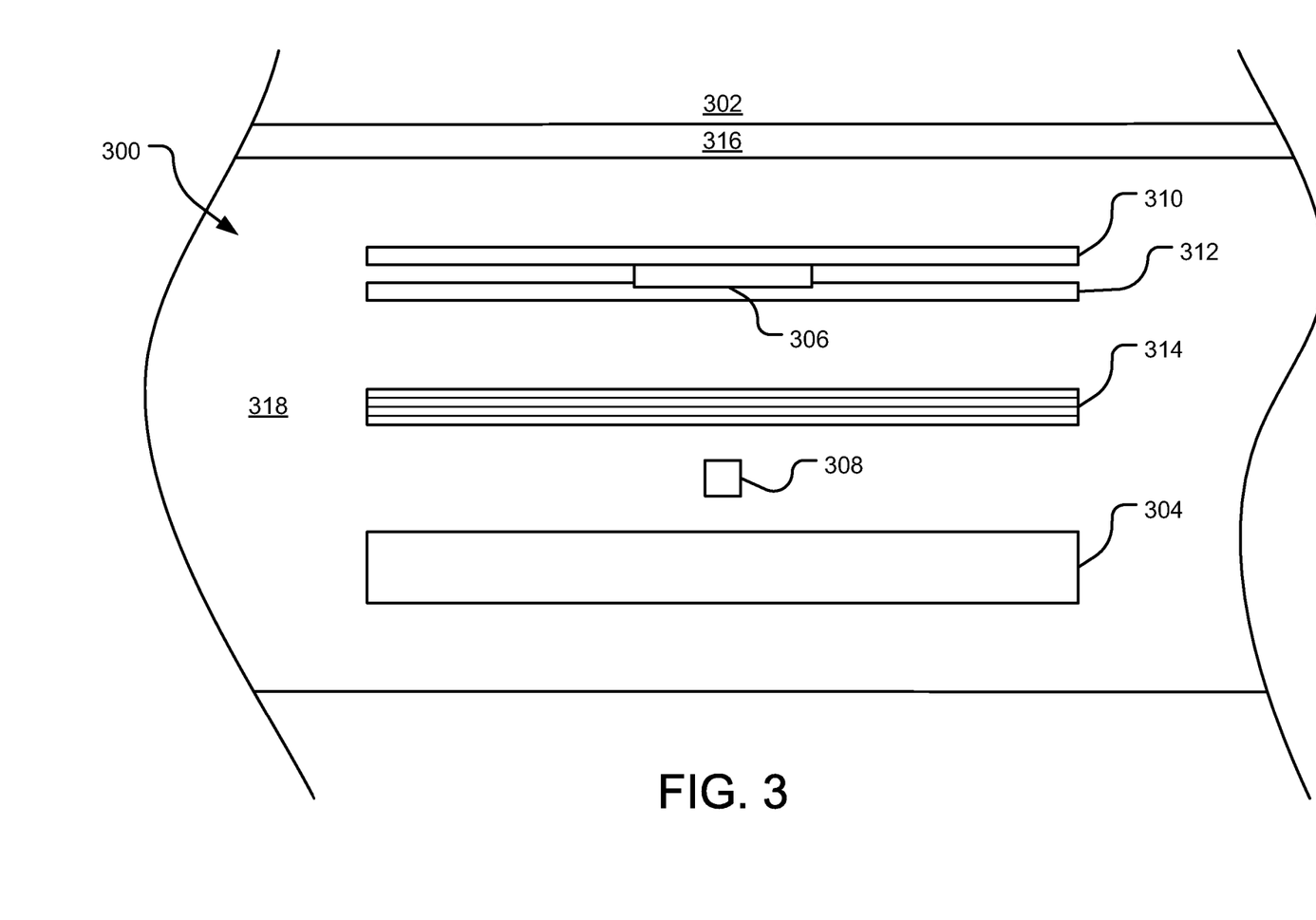
FIG. 3 illustrates a plan view of an example array of microelectronics deposited on a trailing surface of a slider with a laminated second return pole.

FIG. 3 illustrates a plan view of an example array of microelectronics 300 deposited on a trailing surface of a slider 302 with a laminated second return pole 314. Like the microelectronics 100, 200 of FIGS. 1 and 2, the microelectronics 300 include various components for reading and writing information to and from a magnetic media (e.g., a reader 306, a writer 308, a first reader shield 310, a second reader shield 312, a first return pole 304, and the second return pole 314).

Dissimilar to the embodiments of FIGS. 1 and 2, the second return pole 314 rather than the first return pole 304 is the contact pad in FIG. 3 and in this embodiment comprises four thin film layers laminated together. In this embodiment, the second return pole 314 extends closer to the magnetic media than the other microelectronic components, including the first return pole 304. In various other embodiments, the second return pole 314 may comprise more or less laminated layers and may be used as a contact pad in addition to the first return pole 304 rather than instead of the first return pole 304.

Figure 4:
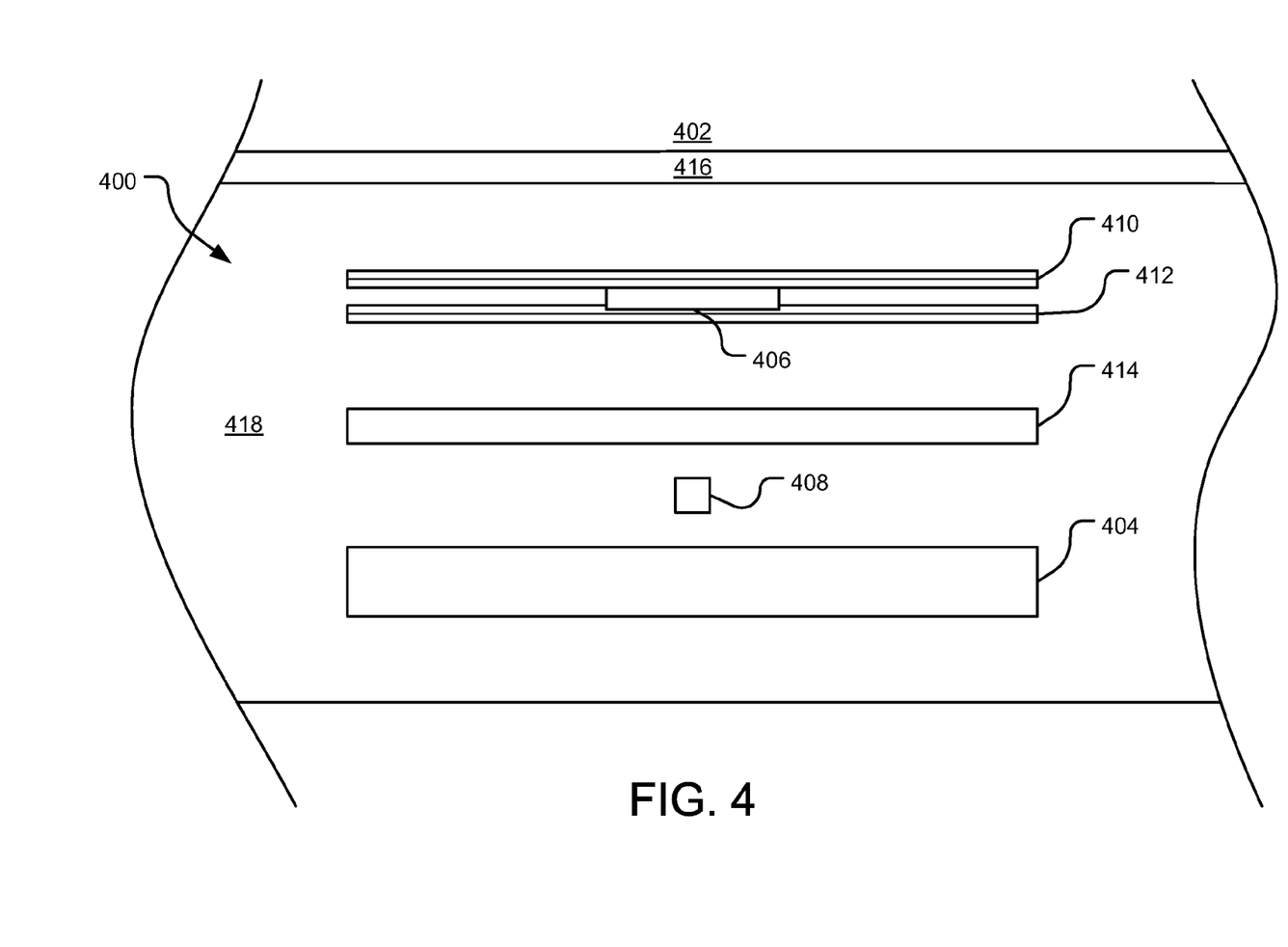
FIG. 4 illustrates a plan view of an example array of microelectronics deposited on a trailing surface of a slider with laminated reader shields.

FIG. 4 illustrates a plan view of an example array of microelectronics 400 deposited on a trailing surface of a slider 402 with laminated reader shields 410, 412. Like the microelectronics 100, 200, 300 of FIGS. 1-3, the microelectronics 400 include various components for reading and writing information to and from a magnetic media (e.g., a reader 406, a writer 408, the first reader shield 410, the second reader shield 412, a first return pole 404, and a second return pole 414).

Dissimilar to the embodiments of FIGS. 1-3, the reader shields 410, 412 rather than one or more of the return poles 404, 414 are the contact pad in FIG. 4 and in this embodiment each comprises two thin film layers of soft metals laminated together. In this embodiment, the reader shields 410, 412 extend closer to the magnetic media than the other microelectronic components, including the return poles 404, 414 and reader 406. In various other embodiments, each of the reader shields 410, 412 may comprise more laminated layers and may be used as a contact pad in addition to one or both of the return poles 404, 414 rather than instead of the return poles 404, 414.

Figure 5:
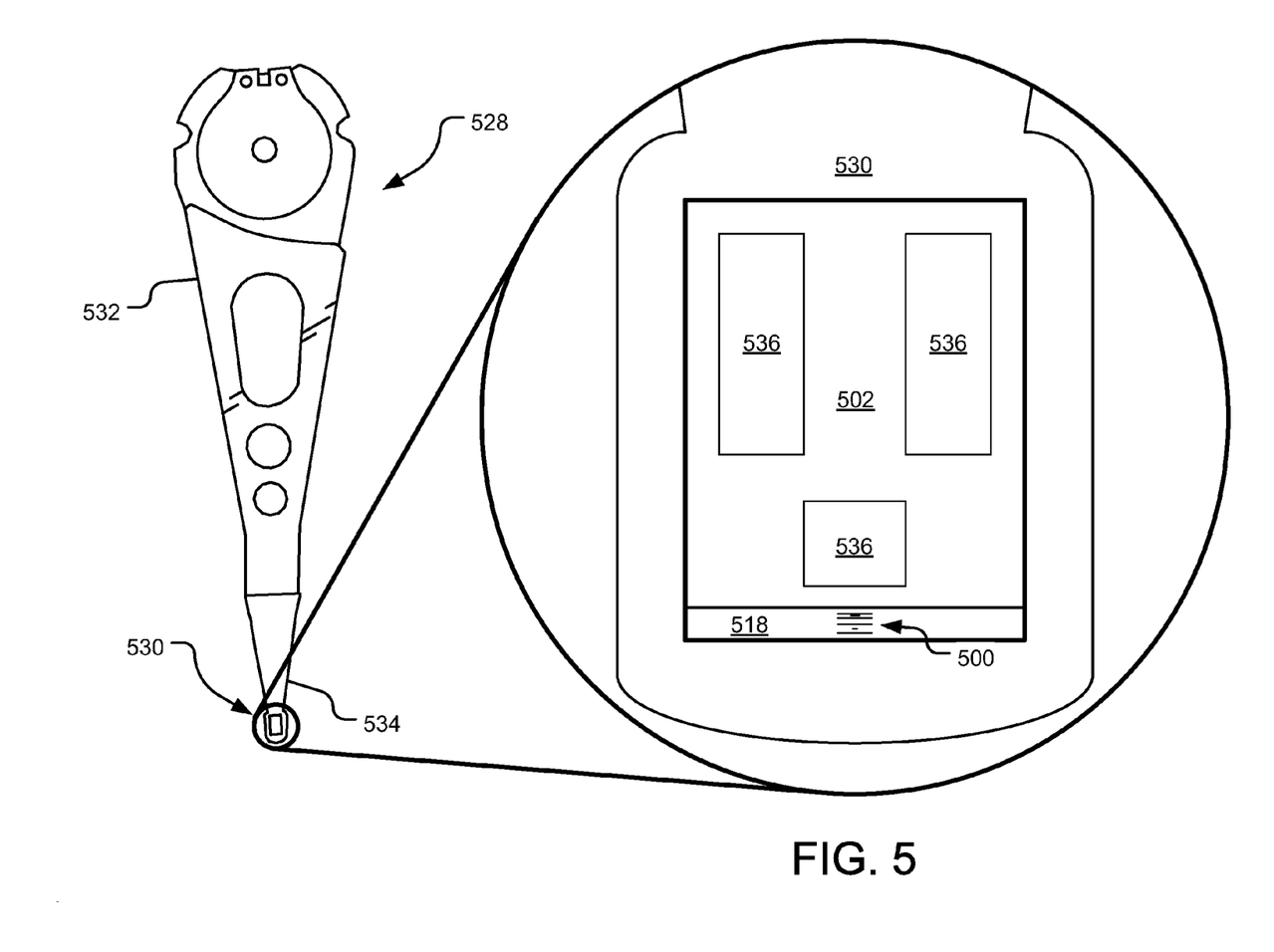
FIG. 5 illustrates a plan view of an example transducer arm with a detail view of a transducer head at a distal end of the transducer arm.

FIG. 5 illustrates a plan view of an example actuator assembly 528 with a detail view of a transducer head 530 at a distal end of the actuator assembly 528. The actuator assembly 528 includes one or more actuator arms 532 with one or more flexures 534 extending from each of the actuator arms 532. Mounted at the distal end of each of the flexures 534 is a head 530 that includes an air bearing slider 502 enabling the head 530 to fly in close proximity above the corresponding surface of an associated disc. The transducer head 530 of FIG. 5 is shown from a perspective looking up from the associated disc.

The slider 502 incorporates air bearing features 536 to control the aerodynamic interaction between the slider 502 and the spinning magnetic disc thereunder in order to set and control fly height of the transducer head 530. Microelectronics 500 (discussed in detail above) are mounted on a trailing edge of the slider 502. In other embodiments, the microelectronics 500 may be mounted on a leading edge or side edge of the slider 502. The microelectronics 500 are separated from the slider 502 and sealed from the environment by layers of dielectric material 518. The microelectronics 500 may be mounted on an air bearing feature 536 as shown in FIG. 5, or elsewhere on the slider 502.

Figure 6:
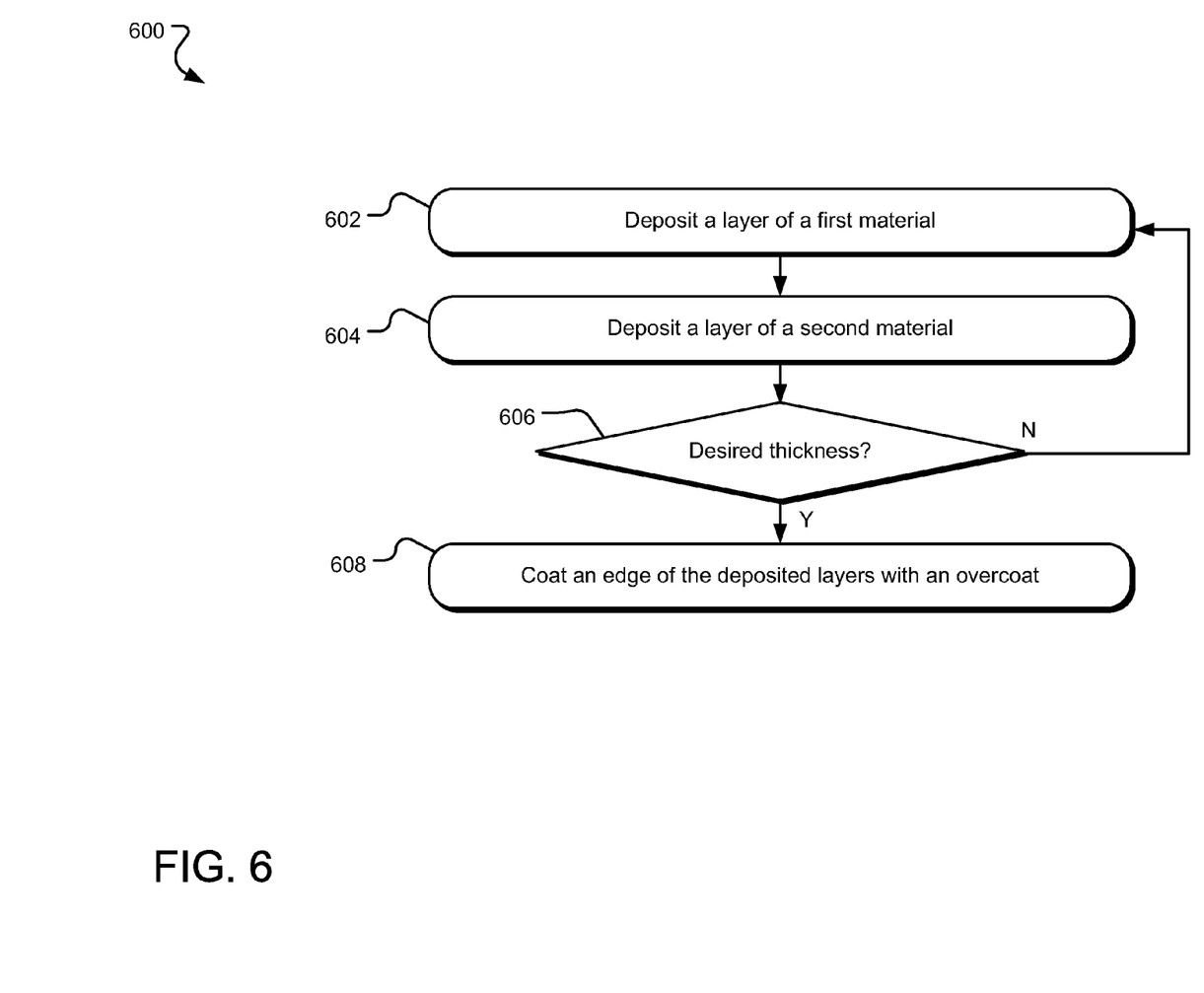
FIG. 6 illustrates example operations for creating a laminated contact pad according to the presently disclosed technology.

FIG. 6 illustrates example operations for creating a laminated contact pad according to the presently disclosed technology. In a first deposition operation 602, a layer of a first material with a first yield strength is deposited on a substrate. In one embodiment, the first material has desired magnetic properties (e.g., coercivity and anisotropy) but has a low yield strength. In a second deposition operation 604, a layer of a second material with a second yield strength is deposited on the first layer. In one embodiment, the first material also has desired magnetic properties (e.g., coercivity and anisotropy) but also has a low yield strength.

Deposition of alternating layers of the first material and second material continues until a desired total thickness of a composite of the layers is reached. In an alternative embodiment, additional materials are incorporated in the composite of layers. When a determination operation 606 determines that the desired thickness has been met, a coating operation 608 coats an edge of the deposited layers with an overcoat. The overcoat is more robust due to the improved yield strength of the underlying composite of layers as compared to an overcoat of an edge of the first material or second material alone.

Figure 7:
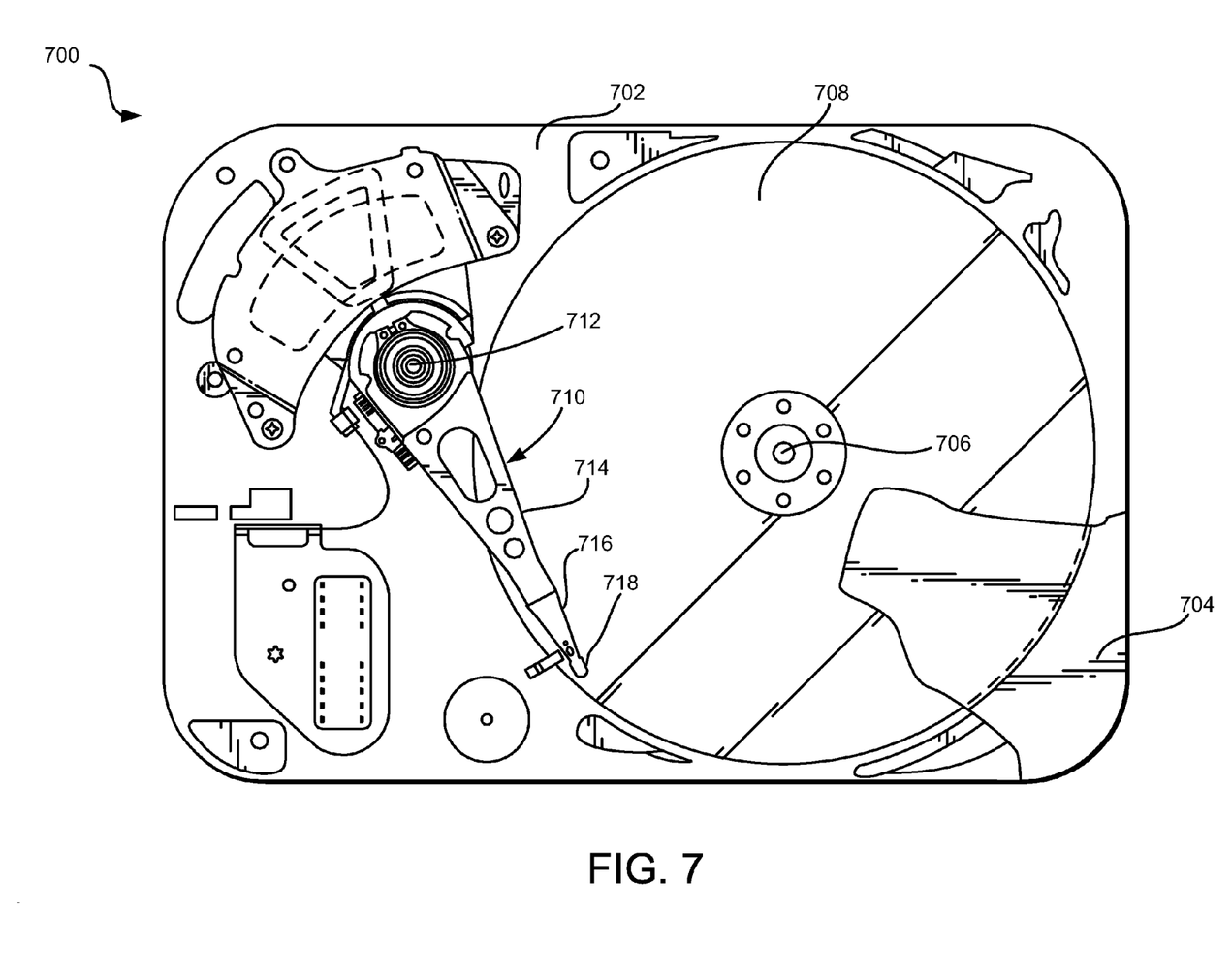
FIG. 7 illustrates a plan view of an example disc drive.

FIG. 7 illustrates a plan view of an example disc drive 700. The disc drive 700 includes a base 702 to which various components of the disc drive 700 are mounted. A top cover 704, shown partially cut away, cooperates with the base 702 to form an internal, sealed environment for the disc drive in a conventional manner. The components include a spindle motor 706 that rotates one or more storage medium discs 708 at a constant high speed. Information is written to and read from tracks on the discs 708 through the use of an actuator assembly 710, which rotates during a seek operation about a bearing shaft assembly 712 positioned adjacent the discs 708. The actuator assembly 710 includes a plurality of actuator arms 714 that extend towards the discs 708, with one or more flexures 716 extending from each of the actuator arms 714. Mounted at the distal end of each of the flexures 716 is a head 718 that includes an air bearing slider enabling the head 718 to fly in close proximity above the corresponding surface of the associated disc 708. The air bearing slider includes one or more laminated contact pads as described herein. The distance between the one or more laminated contact pads and the storage media surface during flight is referred to herein as the fly height.

The operations for creating a laminated contact pad may be implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or the claim language inherently necessitates a specific order.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A transducer head comprising:
   a reader; and
   a contact pad, wherein the contact pad extends beyond the reader at an air bearing surface of the transducer head and comprises
      a first layer of material with a first yield strength;
      a second layer of material with a second yield strength, laminated to the first layer, wherein a third yield strength of a laminated composite of the first layer and the second layer exceeds the first yield strength and the second yield strength; and
   an overcoat in contact with a common edge of the first layer and the second layer at the air bearing surface of the transducer head.

2. The transducer head of claim 1, wherein the contact pad further comprises:
   a third layer of material with a fourth yield strength, laminated to the second layer, wherein a fifth yield strength of a laminated composite of the first layer, second layer, and third layer exceeds the first yield strength, second yield strength, and fourth yield strength, and wherein the overcoat is further in contact with an edge of the third layer at the air bearing surface of the transducer head.

3. The transducer head of claim 1, wherein the contact pad further comprises:
   a third layer of material with the first yield strength, laminated to the second layer; and
   a fourth layer of material with the second yield strength, laminated to the third layer, wherein a fourth yield strength of a laminated composite of the first layer, second layer, third layer, and fourth layer exceeds the first yield strength and the second yield strength, and wherein the overcoat is further in contact with an edge of the third layer and the fourth layer at the air bearing surface of the transducer head.

4. The transducer head of claim 1, wherein at least one of the first material and the second material includes an elemental metal.

5. The transducer head of claim 1, wherein at least one of the first material and the second material is magnetic.

6. The transducer head of claim 1, wherein the contact pad is one or both of a return pole and a reader shield.

7. The transducer head of claim 1, wherein the overcoat faces a data storage medium.

8. The transducer head of claim 1, wherein the first layer and the second layer each converge with the air bearing surface.

9. A transducer head comprising:
   a writer; and
   a return pole extending beyond the writer at an air bearing surface of the transducer head and including a first layer of material with a first yield strength and a second layer of material with a second yield strength, wherein the second layer is laminated to the first layer, and wherein a third yield strength of a laminated composite of the first layer and the second layer exceeds the first yield strength and the second yield strength; and
   an overcoat in contact with an edge of the first layer and the second layer at the air bearing surface of the transducer head.

10. The transducer head of claim 9, wherein the return pole further includes a third layer of material with a fourth yield strength laminated to the second layer, wherein a fifth yield strength of a laminated composite of the first layer, second layer, and third layer exceeds the first yield strength, second yield strength, and fourth yield strength, and wherein the overcoat is further in contact with an edge of the third layer at the air bearing surface of the transducer head.

11. The transducer head of claim 9, wherein the return pole further includes a third layer of material with the first yield strength laminated to the second layer and a fourth layer of material with the second yield strength laminated to the third layer, wherein a fourth yield strength of a laminated composite of the first layer, second layer, third layer, and fourth layer exceeds the first yield strength and the second yield strength, and wherein the overcoat is further in contact with an edge of the third layer and the fourth layer at the air bearing surface of the transducer head.

12. The transducer head of claim 9, wherein at least one of the first material and the second material includes an elemental metal.

13. The transducer head of claim 9, wherein at least one of the first material and the second material is magnetic.

14. The transducer head of claim 9, wherein the overcoat faces a data storage media.

15. The transducer head of claim 9, wherein the return pole is a contact pad configured to face a data storage media.

16. A method of fabricating a contact pad on a transducer head, the method comprising:
   depositing a first layer of material with a first yield strength on a substrate on the transducer head;
   depositing a second layer of material with a second yield strength on the first layer, wherein a third yield strength of a composite of the first layer and the second layer exceeds the first yield strength and the second yield strength; and
   coating a common edge of the first layer and the second layer, wherein the first layer of material, second layer of material, and the coating collectively comprise the contact pad and the contact pad protrudes from the transducer head and is configured to face a data storage medium.

17. The method of claim 16, further comprising:
   depositing a third layer of material with a fourth yield strength on the second layer, wherein a fifth yield strength of a composite of the first layer, second layer, and third layer exceeds the first yield strength, second yield strength, and fourth yield strength, and wherein the coating operation further includes coating an edge of the third layer.

18. The method of claim 16, further comprising:
   depositing a third layer of material with the second yield strength on the second layer;
   depositing a fourth layer of material with the second yield strength on the third layer, wherein a fourth yield strength of a composite of the first layer, second layer, third layer, and fourth layer exceeds the first yield strength and the second yield strength, and wherein the coating operation further includes coating an edge of the third layer and the fourth layer.

19. The method of claim 16, wherein at least one of the first material and the second material includes an elemental metal.

20. The method of claim 16, wherein at least one of the first material and the second material is magnetic.

21. The method of claim 16, wherein each of the first layer and the second layer has a thickness greater than 50 nanometers and less than 200 nanometers.

22. The method of claim 16, wherein the first layer and the second layer each converge with an air bearing surface of the transducer head.

* * * * *